(12) United States Patent
Wong et al.

(10) Patent No.: US 10,385,715 B2
(45) Date of Patent: Aug. 20, 2019

(54) FLOATING, NON-CONTACT SEAL WITH ANGLED BEAMS

(71) Applicant: United Technologies Corporation, Farmington, CT (US)

(72) Inventors: Joey Wong, Enfield, CT (US); Conway Chuong, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 383 days.

(21) Appl. No.: 15/249,813

(22) Filed: Aug. 29, 2016

(65) Prior Publication Data
US 2018/0058238 A1    Mar. 1, 2018

(51) Int. Cl.
*F01D 11/02*    (2006.01)
*F01D 25/24*    (2006.01)
(Continued)

(52) U.S. Cl.
CPC .............. *F01D 11/025* (2013.01); *F01D 5/02* (2013.01); *F01D 11/00* (2013.01); *F01D 11/02* (2013.01); *F01D 11/08* (2013.01); *F01D 25/24* (2013.01); *F04D 29/053* (2013.01); *F04D 29/083* (2013.01); *F04D 29/321* (2013.01); *F04D 29/522* (2013.01); *F16J 15/44* (2013.01); *F16J 15/441* (2013.01); *F16J 15/442* (2013.01); *F16J 15/445* (2013.01); *F05D 2220/32* (2013.01);
(Continued)

(58) Field of Classification Search
CPC .......... F01D 5/02; F01D 11/025; F01D 11/00; F01D 11/08; F01D 11/02; F01D 25/24; F04D 29/053; F04D 29/083; F04D 29/321; F04D 29/522; F16J 15/44; F16J 15/441; F16J 15/442; F16J 15/445; F05D 2220/32; F05D 2240/60; F05D 2250/13; F05D 2260/50
See application file for complete search history.

(56) References Cited

U.S. PATENT DOCUMENTS 3,144,710 A   8/1964 Hollander
3,514,112 A   5/1970 Pettengill
(Continued)

FOREIGN PATENT DOCUMENTS

FR    2675560 A1    10/1992

OTHER PUBLICATIONS

EP search report for EP17178853.2 dated Dec. 15, 2017.
(Continued)

*Primary Examiner* — Igor Kershteyn
(74) *Attorney, Agent, or Firm* — O'Shea Getz P.C.

(57) ABSTRACT

Aspects of the disclosure are directed to a floating, non-contact seal comprising: a shoe, a first beam coupled to the shoe, and a second beam coupled to the shoe, where the first beam is oriented at a first angle with respect to the shoe, the first angle having a first value that is greater than five degrees. Aspects of the disclosure are directed to an engine comprising: a first structure, a second structure configured to rotate relative to the first structure, and a floating, non-contact seal that interfaces the first structure and the second structure, where the seal includes: a shoe, a first beam coupled to the shoe, and a second beam coupled to the shoe, where the first beam is oriented at a first angle with respect to the shoe, the first angle having a first value that is greater than five degrees.

20 Claims, 6 Drawing Sheets

(51) Int. Cl.
*F01D 5/02* (2006.01)
*F04D 29/053* (2006.01)
*F04D 29/08* (2006.01)
*F04D 29/32* (2006.01)
*F04D 29/52* (2006.01)
*F01D 11/00* (2006.01)
*F01D 11/08* (2006.01)
*F16J 15/44* (2006.01)

(52) U.S. Cl.
CPC ...... *F05D 2240/60* (2013.01); *F05D 2250/13* (2013.01); *F05D 2260/50* (2013.01)

(56) References Cited

U.S. PATENT DOCUMENTS

| | | | | |
|---|---|---|---|---|
| 4,046,388 | A * | 9/1977 | Meyer | F01D 11/02 |
| | | | | 277/418 |
| 4,363,599 | A | 12/1982 | Cline | |
| 4,872,812 | A | 10/1989 | Hendley | |
| 5,127,793 | A | 7/1992 | Walker | |
| 5,755,445 | A * | 5/1998 | Arora | F01D 11/005 |
| | | | | 277/418 |
| 6,254,344 | B1 | 7/2001 | Wright | |
| 7,182,345 | B2 * | 2/2007 | Justak | F01D 11/00 |
| | | | | 277/355 |
| 7,410,173 | B2 * | 8/2008 | Justak | F01D 11/00 |
| | | | | 277/355 |
| 7,726,660 | B2 * | 6/2010 | Datta | F01D 11/02 |
| | | | | 277/411 |
| 7,896,352 | B2 * | 3/2011 | Justak | F16J 15/442 |
| | | | | 277/411 |
| 8,002,285 | B2 * | 8/2011 | Justak | F01D 11/02 |
| | | | | 277/412 |
| 8,126,628 | B2 | 2/2012 | Hershey | |
| 8,172,232 | B2 * | 5/2012 | Justak | F16J 15/442 |
| | | | | 277/411 |
| 8,505,411 | B2 | 8/2013 | Justak | |
| 8,628,092 | B2 * | 1/2014 | Deo | F01D 11/12 |
| | | | | 277/412 |
| 8,641,045 | B2 | 2/2014 | Justak | |
| 8,919,781 | B2 | 12/2014 | Justak | |
| 9,016,692 | B2 | 4/2015 | Haubold | |
| 2004/0155410 | A1 * | 8/2004 | Proctor | F16J 15/164 |
| | | | | 277/409 |
| 2006/0249912 | A1 | 11/2006 | Wilson | |
| 2014/0008871 | A1 | 1/2014 | Bidkar et al. | |
| 2015/0192028 | A1 | 7/2015 | Gieg | |
| 2016/0003085 | A1 | 1/2016 | Roberge | |
| 2016/0097294 | A1 | 4/2016 | Wilson | |
| 2016/0115804 | A1 | 4/2016 | Wilson et al. | |

OTHER PUBLICATIONS

L.P. Ludwig, "Sealing Technology for Aircraft Gas Turbine Engines", NASA Technical Memorandum X-71607, Presentation Paper for Tenth Propulsion Conference, San Diego, California, Oct. 21-24, 1974.

* cited by examiner

FLOATING, NON-CONTACT SEAL WITH ANGLED BEAMS

STATEMENT REGARDING FEDERALLY SPONSORED RESEARCH OR DEVELOPMENT

This invention was made with government support under contract number FA8650-09-D-2923-0021 awarded by the United States Air Force. The government has certain rights in the invention.

BACKGROUND

Seals are used in aircraft engines to isolate a fluid from one or more areas/regions of the engine. For example, seals control various parameters (e.g., temperature, pressure) within the areas/regions of the engine and ensure proper/efficient engine operation and stability.

Figure 2A:
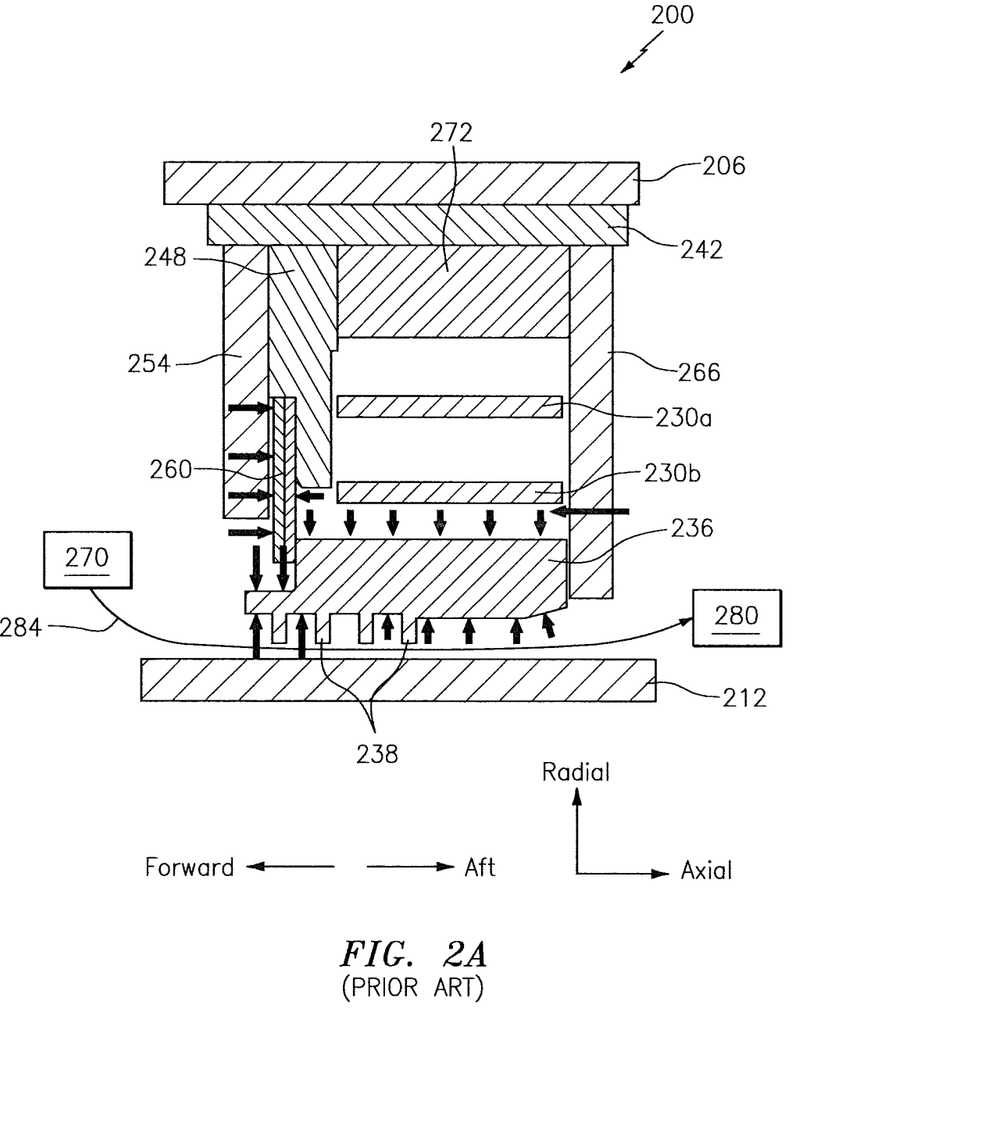
FIG. 2A illustrates a prior art sealing system.
Figure 2B:
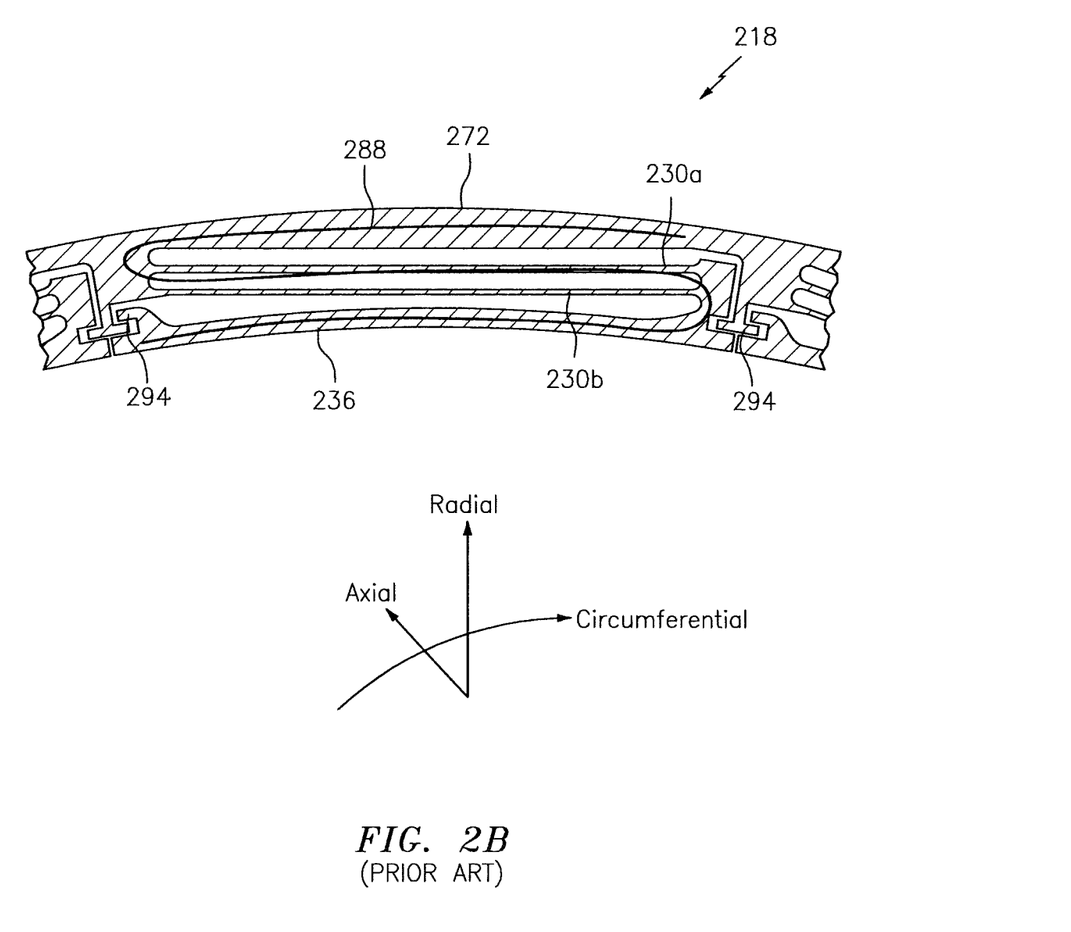
FIGS. 2B-2C illustrate a prior art seal of the system of FIG. 2A.

Referring to FIGS. 2A-2B, a prior art sealing system 200 is shown. The system 200 is used to provide an interface between a static engine structure 206 and a rotating engine structure 212. The system 200 includes a floating, non-contact seal 218 that is formed from beams 230a and 230b and a shoe 236 coupled to the beams 230a and 230b. The seal 218 may interface to the structure 206 via a carrier 242. A spacer 248 may separate the carrier 242 and/or the beams 230a and 230b from a seal cover 254. Secondary seals 260 may be included in a cavity formed between the spacer 248, the cover 254 and the shoe 236. The spacer 248 and/or the seal cover 254 may help to maintain an (axial) position of the secondary seals 260. The shoe 236 may interface to (e.g., may slide or rotate with respect to) a scalloped plate 266. The shoe 236 and the beams 230a and 230b may interface to an outer ring structure 272. The seal 218 may include at least some characteristics that are common with a HALO® seal provided by, e.g., Advanced Technologies Group, Inc. of Stuart, Fla.

In operation, air flows from a high pressure area/region 270 of the engine to a low pressure area/region 280 of the engine as shown via the arrow 284. As the air flows passes teeth 238 of the shoe 236 (where the teeth 238 are frequently formed as thin knife-edges), an associated pressure field changes. This change induces the shoe 236 to move in, e.g., the radial reference direction until an equilibrium condition is obtained. In this respect, the seal 218 is adaptive to changing parameters and allows for maintenance of clearances between the structures 206 and 212 within a relatively tight range in order to promote engine performance/efficiency. The secondary seals 260 may promote the flow 284 from the high pressure region 270 to the low pressure region 280 as shown between the shoe 236 (e.g., teeth 238) and the rotating structure 212.

As part of conventional seal designs, to accommodate the movement of the shoe 236 described above the beams 230a and 230b are arranged so as to be substantially parallel to the shoe 236, creating an 'S'-like shape 288 between the beams 230a and 230b and the shoe 236 as superimposed in FIG. 2B. And, as shown in FIG. 2C, a four-bar linkage 292 is created by the parallel beams 230a and 230b.

Figure 2C:
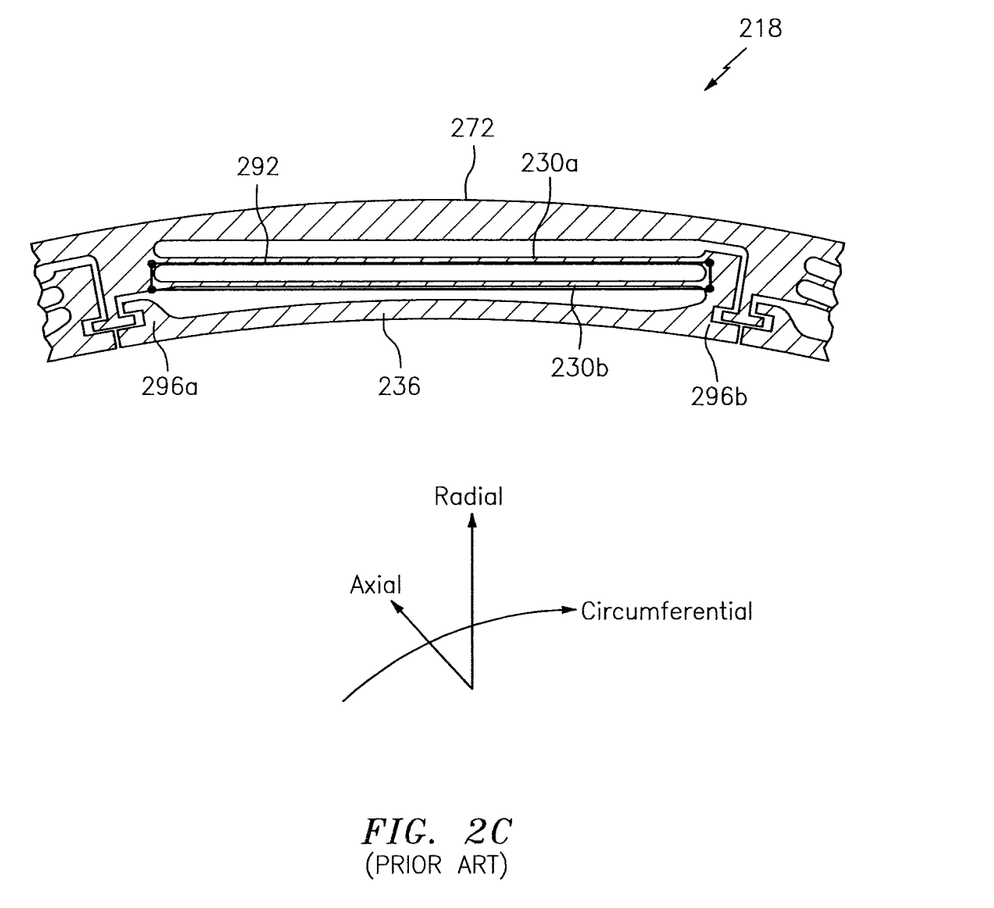

Conventional seal designs, such as those shown in relation to FIGS. 2A-2C, may be prone to beam imbalance. For example, and as shown in FIG. 2C, if a first portion of the shoe 236 at a first location 296a (e.g., a first circumferential location) moves a first distance (e.g., a first radial distance) and a second portion of the shoe 236 at a second location 296b (e.g., a second circumferential location) moves a second distance (e.g., a second radial distance) that is different from the first distance, the shoe 236 may be prone to "saw-toothing". If this saw-toothing/imbalance in terms of the differences in movement/deflection between the first location 296a and the second location 296b is substantial enough, the gap/distance control that is sought by the use of the adaptive seal 218 may be at least partially defeated, which may result in excessive rubbing and/or excessive leakage. Additionally, since the beams 230a and 230b are relatively crowded in the conventional, parallel configuration, space is limited and the length of the beams 230a and 230b is limited. This limitation in the length of the beams 230a and 230b limits the range of the travel of the shoe 236.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a floating, non-contact seal comprising: a shoe, a first beam coupled to the shoe, and a second beam coupled to the shoe, where the first beam is oriented at a first angle with respect to the shoe, the first angle having a first value that is greater than five degrees. In some embodiments, the second beam is oriented at a second angle with respect to the shoe, the second angle having a second value that is greater than five degrees. In some embodiments, the second value is less than ten degrees. In some embodiments, the first value is less than ten degrees. In some embodiments, the first beam is coupled to the shoe at a first location of the shoe and the second beam is coupled to the shoe at a second location of the shoe that is different from the first location. In some embodiments, the first beam, the second beam, and the shoe form a four-bar linkage. In some embodiments, the four-bar linkage is shaped as a parallelogram.

Aspects of the disclosure are directed to an engine comprising: a first structure, a second structure configured to rotate relative to the first structure, and a floating, non-contact seal that interfaces the first structure and the second structure, where the seal includes: a shoe, a first beam coupled to the shoe, and a second beam coupled to the shoe, where the first beam is oriented at a first angle with respect to the shoe, the first angle having a first value that is greater than five degrees. In some embodiments, the first structure is an engine case. In some embodiments, the second structure includes at least one of a shaft or a rotor disk. In some embodiments, the first and second structures are part of a compressor section of the engine. In some embodiments, the first and second structures are part of a turbine section of the engine. In some embodiments, the seal interfaces a first region of the engine to a second region of the engine in terms of an airflow from the first region of the engine to the second region of the engine. In some embodiments, the shoe comprises a plurality of teeth, and the airflow substantially flows in an axial direction relative to a centerline of the engine, radially between the teeth and the second structure. In some embodiments, the teeth are located radially outward of the second structure with respect to an axial centerline of the engine. In some embodiments, the second beam is oriented at a second angle with respect to the shoe, the second angle having a second value that is greater than five degrees, and where each of the first value and the second value is less than ten degrees. In some embodiments, the first beam is coupled to the shoe at a first location of the shoe and the second beam is coupled to the shoe at a second location of the shoe that is different from the first location. In some embodiments, the first beam, the second beam, and the shoe form a four-bar linkage. In some embodiments, the four-bar linkage is shaped as a parallelogram. In some embodiments, the first beam has a first length and the second beam has a second length that is equal to the first length.

BRIEF DESCRIPTION OF THE DRAWINGS

The present disclosure is illustrated by way of example and not limited in the accompanying figures in which like reference numerals indicate similar elements. The drawing figures are not necessarily drawn to scale unless specifically indicated otherwise.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

In accordance with various aspects of the disclosure, apparatuses, systems, and methods are described for balancing a seal. In accordance with this disclosure, a four-bar linkage associated with the seal may be provided, where beams of the seal are angled (e.g., non-parallel) relative to a shoe of the seal.

Figure 1:
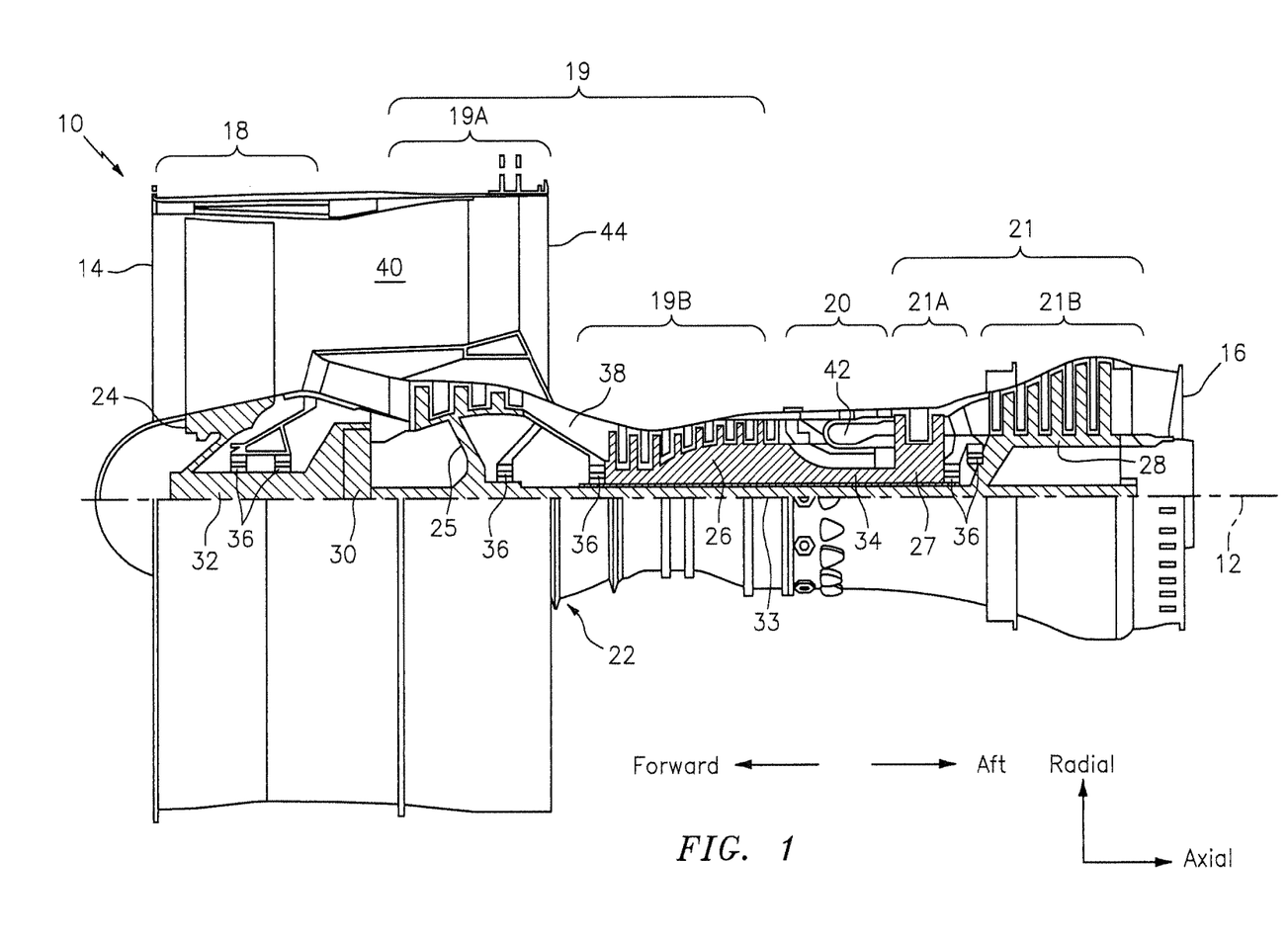
FIG. 1 is a side cutaway illustration of a geared turbine engine.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

Figure 3:
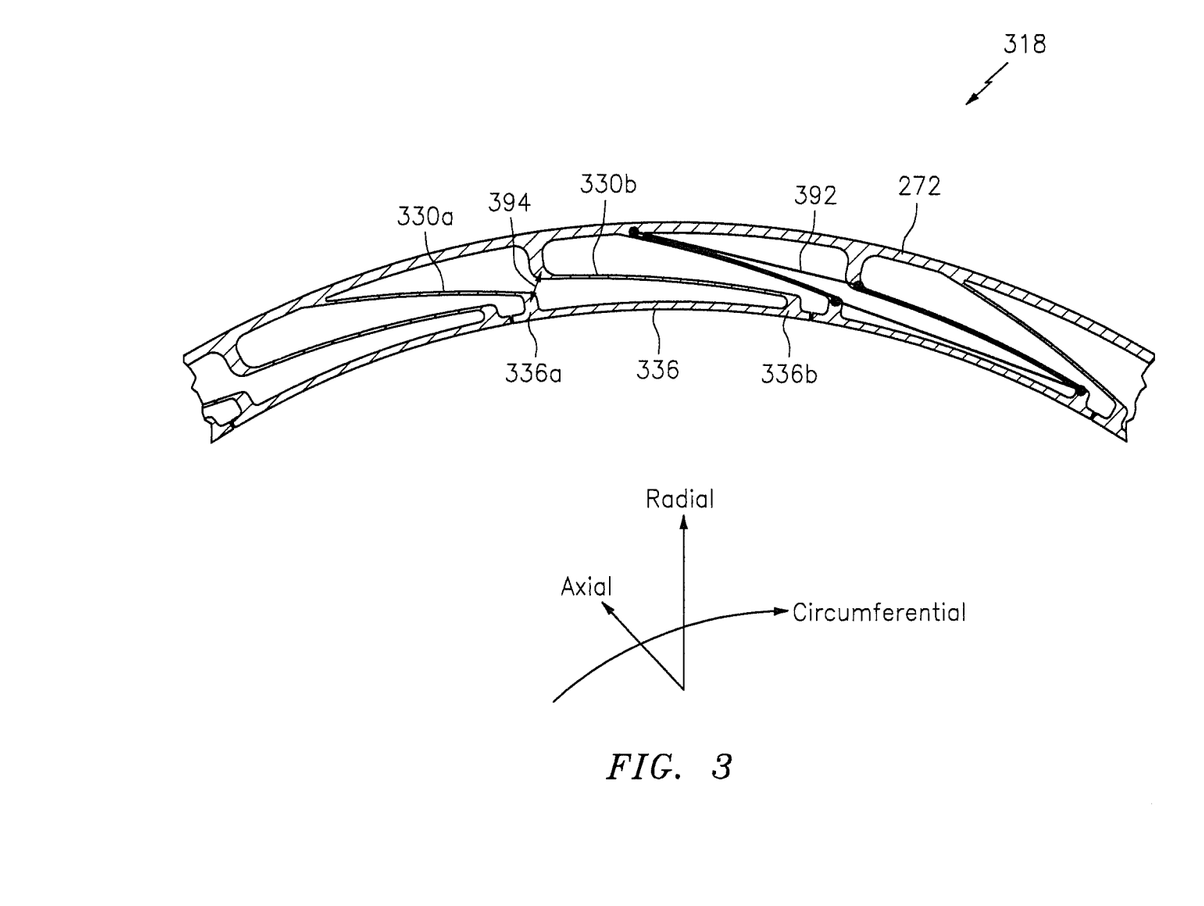
FIG. 3 illustrates a seal in accordance with aspects of this disclosure.

Referring now to FIG. 3, a seal 318 is shown. The seal 318 may be incorporated as part of one or more sections of an engine, such as for example, the compressor section 19 or the turbine section 21 of the engine 10 (see FIG. 1). The seal 318 may be incorporated as part of a sealing environment, such as for example as part of one or more portions of the system 200 of FIG. 2A.

As shown in FIG. 3, the seal 318 may include a shoe 336 that is coupled to beams, e.g., beams 330a and 330b. The beam 330a may be coupled to a first (circumferential) location 336a of the shoe 336 and the beam 330b may be coupled to a second (circumferential) location 336b of the shoe 336, the second location 336b substantially different from the first location 336a. This may be contrasted with the seal 218 shown in FIGS. 2B-2C, where the beams 230a and 230b are coupled to the shoe 236 at the same circumferential location of the shoe 236.

The seal 318 may include a four-bar linkage 392. Unlike the four-bar linkage 292, which is substantially rectangular in terms of shape and does not incorporate the shoe 236, the four-bar linkage 392 may be substantially shaped as a parallelogram and may incorporate the shoe 336 as a part of the linkage 392.

The beams 330a and 330b may be substantially parallel to one another, but may be angled with respect to the shoe 336. For example, and referring to FIG. 4, a beam (e.g., beam 330a or beam 330b) may form an angle 434 with respect to the shoe 336. The angle 434 may be substantially greater than zero so as to provide for a non-parallel orientation between the beam 330a/330b and the shoe 336. For example, the angle 434 may be greater than five degrees. In some embodiments, the angle 434 may be less than a threshold; in some embodiments, the threshold may be equal to ten degrees.

In some embodiments, a first length of the beam 230a and a second length of the beam 230b may be substantially equal to one another. Allowing the first and second lengths of the beams 230a and 230b, respectively, to be substantially equal to one another may help to avoid the creation/generation of a lever arm. In this respect, the saw-toothing/imbalance described above in connection with FIGS. 2A-2C may be minimized or even completely eliminated via the use of the seal 318. Stated slightly differently, and referring to FIG. 3, the (radial) movements/deflections of the shoe 336 at the locations 336a and 336b may be substantially equal to one another.

Figure 4:
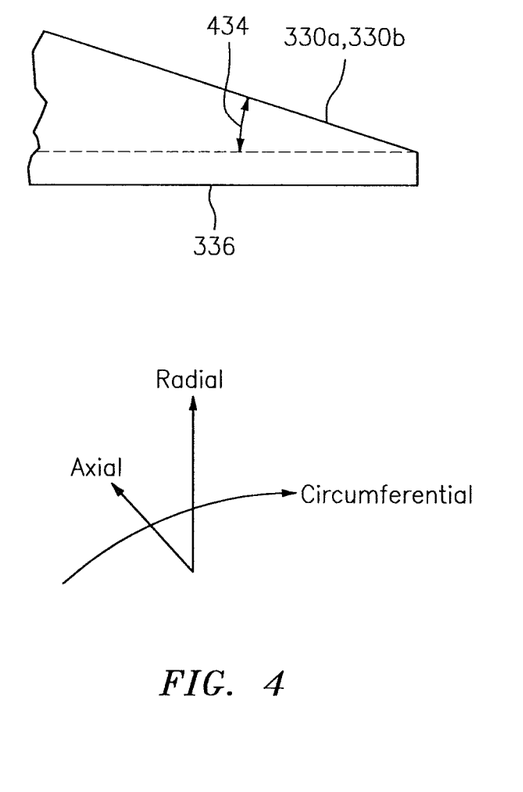
FIG. 4 illustrates a connection between a beam and a shoe of the seal of FIG. 3, including the formation of an angle between the beam and the shoe.

Due to the angled configuration of the beams 330a and 330b relative to the shoe 336 shown in FIGS. 3-4, additional space (in terms of one or more of an axial reference direction, a radial reference direction, or a circumferential reference direction) may be allotted for the beam 330a/330b and shoe 336 placement relative to the embodiments of FIGS. 2A-2B. This additional space may allow for an increase in terms of the range of movement of the shoe 336 and the use of longer beams 330a/330b for greater compliance.

In some embodiments, a distance 394 between a first of the beams (e.g., the beam 330a)/the shoe 336 and the second of the beams (e.g., the beam 330b) may control the amount/degree of movement/deflection of the shoe 336. For example, the first of the beams/shoe may contact the second of the beams so as to close the (radial) gap 394, thereby limiting further movement/deflection of the shoe 336. This may be contrasted with the T-shaped stops/hooks 294 formed in the seal 218 as shown in FIG. 2B.

Technical effects and benefits of this disclosure include a seal and associated sealing system environment that provides for enhanced control in terms of beam balance. The incorporation of a shoe as part of a four-beam linkage may enable two locations (e.g., two circumferential locations, potentially corresponding to substantially equal axial and radial locations/positions) of the shoe to move/deflect in substantially the same amount and in the same direction. This control may help to minimize/reduce wear and leakage with respect to the seal. Aspects of the disclosure may incorporate beams oriented at an angle relative to a shoe, where an angle may be substantially greater than zero so as to discount/disregard the applicability of manufacturing tolerances associated with conventional seals.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A floating, non-contact seal comprising:
a shoe;
a first beam coupled to the shoe at a first shoe location; and
a second beam coupled to the shoe at a second shoe location,
wherein the first beam is oriented at a first angle with respect to the shoe and the second beam is oriented at a second angle with respect to the shoe, and
wherein a distance between the first beam and the second beam in a direction of radially outward deflection of the first shoe location limits a magnitude of radially outward deflection of the first shoe location.

2. The floating, non-contact seal of claim 1, wherein the first and second angles have respective first and second values that are greater than five degrees.

3. The floating, non-contract seal of claim 2, wherein the second value is less than ten degrees.

4. The floating, non-contact seal of claim 3, wherein the first value is less than ten degrees.

5. The floating, non-contact seal of claim 1, wherein the first beam, the second beam, and the shoe form a four-bar linkage.

6. The floating, non-contact seal of claim 5, wherein the four-bar linkage is shaped as a parallelogram.

7. The floating, non-contact seal of claim 4, wherein the first beam has a first length and the second beam has a second length that is equal to the first length.

8. The floating, non-contact seal of claim 7, wherein the first value of the first angle is different than the second value of the second angle.

9. An engine comprising:
a first structure;
a second structure configured to rotate relative to the first structure; and
a floating, non-contact seal that interfaces the first structure and the second structure, wherein the seal includes:
a shoe;
a first beam coupled to the shoe at a first shoe location; and
a second beam coupled to the shoe at a second shoe location,
wherein the first beam is oriented at a first angle with respect to the shoe and the second beam is oriented at a second angle with respect to the shoe, and
wherein a distance between the first beam and the second beam in a direction of radially outward deflection of the first shoe location limits a magnitude of radially outward deflection of the first shoe location.

10. The engine of claim 9, wherein the first structure is an engine case.

11. The engine of claim 9, wherein the second structure includes at least one of a shaft or a rotor disk.

12. The engine of claim 9, wherein the first and second structures are part of a compressor section of the engine.

13. The engine of claim 9, wherein the first and second structures are part of a turbine section of the engine.

14. The engine of claim 9, wherein the seal interfaces a first region of the engine to a second region of the engine in terms of an airflow from the first region of the engine to the second region of the engine.

15. The engine of claim 14, wherein the shoe comprises a plurality of teeth, and wherein the airflow substantially flows in an axial direction relative to a centerline of the engine, radially between the teeth and the second structure.

16. The engine of claim 15, wherein the teeth are located radially outward of the second structure with respect to an axial centerline of the engine.

17. The engine of claim 9, wherein the first and second angles have respective first and second values that are greater than five degrees and less than ten degrees.

18. The engine of claim 9, wherein the first beam, the second beam, and the shoe form a four-bar linkage.

19. The engine of claim 18, wherein the four-bar linkage is shaped as a parallelogram.

20. The engine of claim 9, wherein the first beam has a first length and the second beam has a second length that is equal to the first length.

* * * * *